United States Patent [19]

Racine

[11] Patent Number: 4,811,243

[45] Date of Patent: * Mar. 7, 1989

[54] COMPUTER AIDED COORDINATE DIGITIZING SYSTEM

[76] Inventor: Marsh V. Racine, 4069 Alameda Dr., San Diego, Calif. 92103

[*] Notice: The portion of the term of this patent subsequent to Mar. 25, 2003 has been disclaimed.

[21] Appl. No.: 812,513

[22] Filed: Dec. 23, 1985

Related U.S. Application Data

[63] Continuation-in-part of Ser. No. 597,132, Apr. 6, 1984, Pat. No. 4,578,768.

[51] Int. Cl.⁴ .............................................. G06F 15/20
[52] U.S. Cl. .................................. 364/520; 364/560; 381/43
[58] Field of Search ........................... 364/518–521, 364/513.5, 559, 560; 381/43

[56] References Cited

U.S. PATENT DOCUMENTS

| | | | |
|---|---|---|---|
| 3,215,821 | 11/1965 | Stenby | 381/43 X |
| 3,342,979 | 9/1967 | Wright et al. | 377/24 |
| 3,342,979 | 9/1967 | Wright et al. | 235/92 |
| 3,412,238 | 11/1968 | Lineback | 377/24 |
| 3,601,585 | 8/1971 | Paulsen | 377/24 |
| 3,602,902 | 8/1971 | Madden | 364/900 |
| 3,626,483 | 12/1971 | Whetstone et al. | 181/0.5 |
| 3,821,491 | 6/1974 | Whetstone et al. | 179/111 E |
| 3,892,958 | 7/1975 | Tung | 364/709 |
| 3,946,157 | 3/1976 | Dreyfus | 381/43 |
| 4,145,742 | 3/1979 | Olander et al. | 364/709 |
| 4,150,427 | 4/1979 | Slawson | 364/107 |
| 4,232,311 | 11/1980 | Agneta | 340/703 |
| 4,266,279 | 5/1981 | Hines | 364/726 |
| 4,279,015 | 7/1981 | Edelman et al. | 364/200 |
| 4,280,121 | 7/1981 | Crask | 340/365 VL |
| 4,314,330 | 2/1982 | Slawson | 364/192 |
| 4,393,271 | 7/1983 | Fujinami et al. | 381/43 |
| 4,446,520 | 5/1984 | Shigeta et al. | 364/400 |
| 4,467,410 | 8/1984 | Kim | 364/200 |
| 4,484,272 | 11/1984 | Green | 364/200 |
| 4,506,336 | 3/1985 | Hird | 364/518 |
| 4,524,421 | 6/1985 | Searby et al. | 364/521 |
| 4,546,434 | 10/1985 | Gioello | 364/300 |
| 4,567,567 | 1/1986 | Lapeyre | 364/709 |
| 4,573,187 | 2/1986 | Bui et al. | 381/43 |
| 4,578,768 | 3/1986 | Racine | 364/560 |
| 4,586,035 | 4/1986 | Baker et al. | 340/712 |
| 4,595,990 | 6/1986 | Garwin et al. | 364/518 |

OTHER PUBLICATIONS

Let's Get Right to the Point, Computerized Construction Concepts Cooperation 1982.
Let's Get Right to the Point, Texonics Corporation International U.S.A., 1985.
IBM Technical Disclosure Bulletin, vol. 12, No. 3 Aug. 1969 (Gunn et al.) Softward Product Description, Precision Design Builders, Inc. 1981.
Digitizer Routine, PDB, Inc., Jun. 22, 1981 Construction Computer Application Newsletter, Apr. 1983.
Mellichamp, Duncan A; "Real-Time Computing with Applications to Data Acquisition and Control"; Department of Chemical and Nuclear Engineering, University of California, Santa Barbara; 1983; Van Nostrand Reinhold Company Inc.

*Primary Examiner*—Gary V. Harkcom
*Assistant Examiner*—H. R. Herndon
*Attorney, Agent, or Firm*—Brown, Martin, Haller & McClain

[57] ABSTRACT

A computer aided coordinate digitizing system is arranged to read data from construction drawings and make construction estimates from the data. A digitizing device determines a series of X-Y coordinate positions on a flat surface by means of a pointer placed at selected positions on the surface and a sensor assembly for detecting the position of the pointer. The device generates X-Y coordinate signals which are transmitted to a computer associated with the device. The computer is programmed to use the received X-Y coordinate signals to perform calculations in response to entry of computer control functions by an operator using a voice recognition unit which converts vocal commands into computer control signals to operate the computer and initiate the selected computer programs for performing construction estimates.

8 Claims, 2 Drawing Sheets

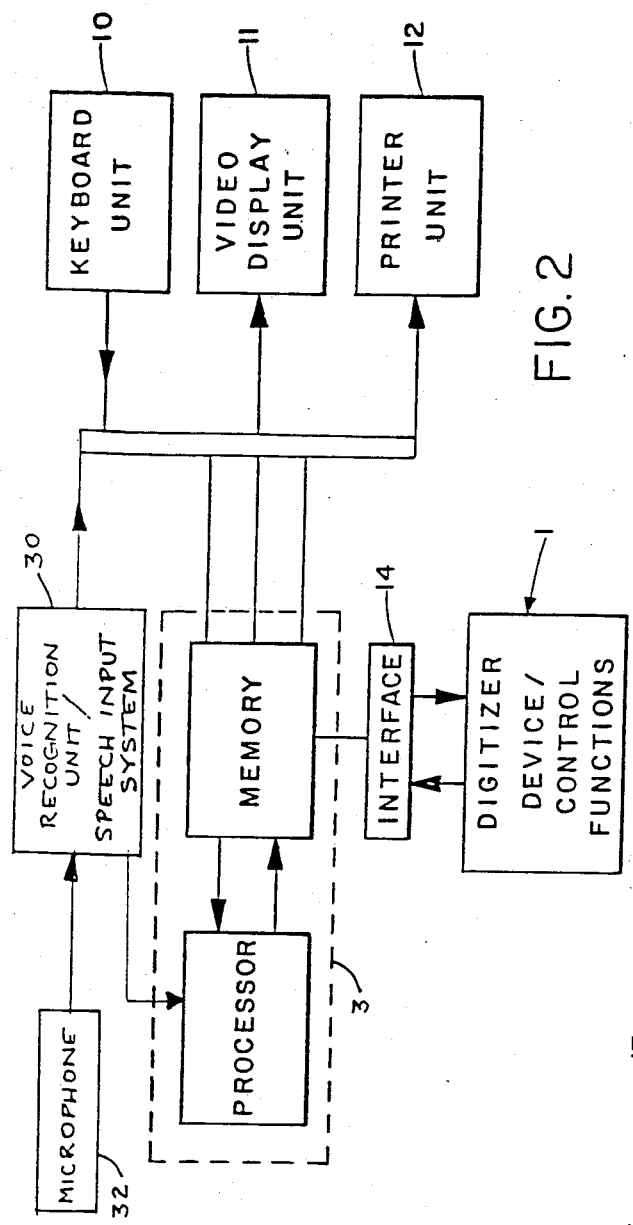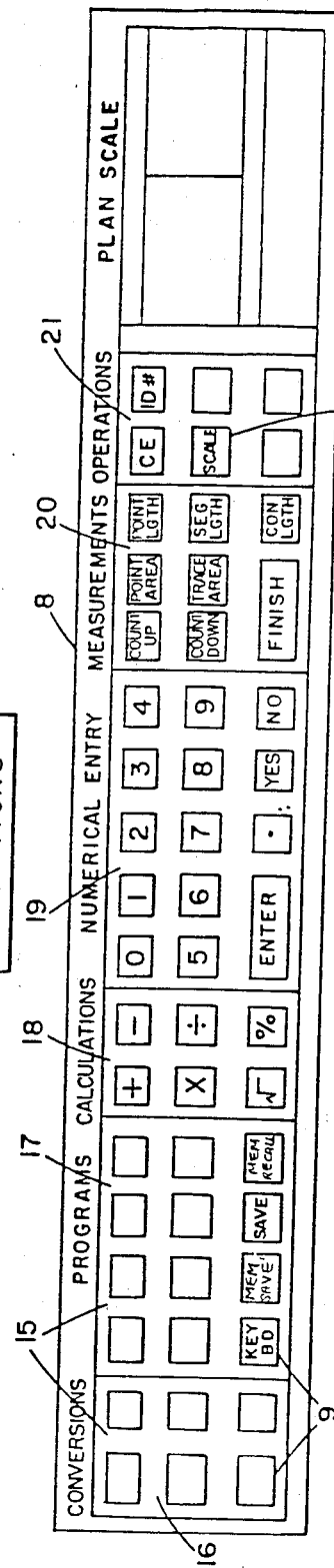

COMPUTER AIDED COORDINATE DIGITIZING SYSTEM

REFERENCE TO RELATED APPLICATIONS

This application is a continuation-in-part of my application Ser. No. 597,132 filed 4-6-84 for a "Computer Aided Coordinate Digitizing System" now U.S. Pat. No. 4,578,768.

BACKGROUND OF THE INVENTION

1. Field of the Invention

The present invention relates to a "Computer Aided Coordinate Digitizing System" for reading plans, maps or other diagrams and for automatically calculating data such as material and cost estimates from the readings

2. DESCRIPTION OF THE PRIOR ART

In the construction, planning, land survey, real estate, and many other industries, it is often necessary to calculate actual dimensions and parameters from blueprint plans, diagrams and/or make quantity estimates from the calculations. It is tedious, time consuming and often inaccurate to make such calculations by hand. To make building cost estimates, for example, it is necessary to take dimensions from the plan, scale these up to actual size, calculate such parameters as area, length or volume from the dimensions, and then convert these parameters into quantities of materials required and their cost. Inaccuracies in such estimates will involve over or under ordering of materials and consequent problems. If any subsequent changes are made to the plans, the entire process must be repeated.

Digitizing devices for taking location readings from plans have been developed, these devices generally comprising a sensor assembly and a signal generator in the form of a pointer which is placed at appropriate positions on a plan to generate a signal which is detected by the sensor assembly to pinpoint the position of the pointer.

After the required location readings have been taken, further calculations are normally required, such as calculations of dimensions, area, volume, material quantities, and so on.

SUMMARY OF THE INVENTION

It is an object of the present invention to provide a digitizing system in which calculations using digitizing location readings can be made speedily and accurately.

According to the present invention, a Computer Aided Coordinate Digitizing System is provided for detecting coordinate positions on a flat surface on which construction drawings are placed and calculating desired parameters such as the cost of construction of a building depicted on the drawings from the detected positions. The system comprises:

a digitizing device for determining a series of X-Y coordinate positions on the surface, comprising pointer means for placing at selected positions on the flat surface and sensor means for detecting the positioning of said pointer means and generating an X-Y coordinate signal corresponding to said positioning:

a computer associated with said digitizing device and linking means for allowing said computer to receive said coordinate signals, said computer having memory means for storing program instructions and said coordinate signals, said program instructions including means for using the generated X-Y coordinate signals in response to respective computer control and calculating functions to calculate a series of selected parameters from the drawings; and a voice activated control unit for operating the system, the control unit comprising means for recognizing vocal commands of a user and converting vocal command into corresponding computer control and calculating functions for operating the computer to perform the desired functions.

Thus the user or operator does not need to repeatedly go from the drawing to the computer keyboard and back, but can use a microphone associated with the control unit to enter one or more vocal commands and enter data manually using the pointer.

The voice activated control unit may be used alone for controlling the system or in addition to a control sheet on which a series of control functions are printed on control area boxes. When the control sheet is placed at a predetermined position on the flat surface relative to the sensor assembly and a plan to be digitized is also placed in the monitored field, the computer is set up to distinguish position data generated by placing the pointer at points on the plan from position data generated by placing the pointer at one of the control sheet boxes. Thus the computer recognizes data generated by placing the pointer at a control box and identifies it as the appropriate command control function. The voice activated control unit may be used in addition to, or instead of, the control sheet, and a switch may be provided to select which control means is to be used. This may be a foot switch or an ON/OFF voice command, for example, so that the operator may switch back forth between control sheet commands and vocal commands if required.

The control sheet may be provided with computer operating functions as well as means for making alpha/-numerical entries, means for making direct measurements from data entered from a plan, and means for effecting a series of programs to calculate and generate various desired information. Other operating functions such as mathematical calculations and unit conversions in both metric or Imperial Math may be provided. The computer is programmed such that each of the control position functions is identified correctly when the sheet is placed in the predetermined position relative to the sensor assembly. Thus a variety of different control functions may be provided, and different control sheets may be provided for different applications of the system, with suitable programming of the computer to identify the control sheet used.

In one embodiment of the invention, the sensor assembly comprises a pair of linear microphones which are adapted to be placed coordinately to one another on a flat, elevated surface, and the pointer comprises a stylus adapted to emit a sound when touched to a surface in the area monitored by the microphones such that the X coordinate position of the sound is detected by one microphone and the Y coordinate position of the sound is detected by the other microphone. Alternatively, the pointer may comprise a programmable cursor which can be moved across a surface until the desired position lies under the cursor cross hairs, and actuated to produce a signal at that point for detection by a suitable sensor assembly.

To operate the system, the operator will adopt the microphones and stylus or cursor to a suitable flat or elevated surface, which may be a table, drawing board, wall, or blackboard, for example. The microphones preferably form an L-shaped frame. If used, the control sheet is then positioned on the flat surface in any position in the field covered by the microphones. Since the computer may be preprogrammed to associate X-Y coordinate data representing positions on a control sheet with the series of control functions provided on the sheet, the stylus can be placed at various points on a plan or map on the surface to produce X-Y coordinate data recognized as positions by the computer, and can be placed on various positions on the control sheet to effect control and handling of the data by the computer. Alternatively, or in addition to the control sheet, a voice activated control system is provided for control of the computer by vocal commands only.

In an alternative embodiment, the sensor assembly may comprise an electromagnetic or electrostatic tablet which itself comprises the flat surface on which the plan, map or drawing is placed. The control sheet is appropriately positioned on the tablet. Such a tablet has a grid of sensors such that pressure or other signals applied at any point via a stylus or cursor device will be detected and a corresponding coordinate signal produced Another sensor assembly which may be used in the system comprises an electromechanical articulated arm with a pointer at its free end. The arm includes detectors for sensing articulations of the arm, and can be calibrated with a suitable flat surface such that X-Y coordinate positions are detected by moving the pointer to selected places on the surface.

The computer is associated with a visual display device, keyboard entry device and a printer device for obtaining printouts of information and calculations, such as material and cost estimates, for example.

With this digitizing system, the operator only needs to use the computer keyboard for initial set up of the system to accept data. During the actual take off of the data from a plan, the operator uses the stylus or cursor to take off positions on the plan and vocal commands, the computer keyboard, or the control sheet to control how the data is handled by the computer. Thus calculations can be made quickly and accurately.

BRIEF DESCRIPTION OF THE DRAWINGS

The following is a brief description of the accompanying drawings, which show a preferred embodiment of the invention:

FIG. 2 is a block diagram of the major components of the system of FIG. 1.

FIG. 3 is a plan view of a typical optional control sheet for use in the system of FIG. 1.

DETAILED DESCRIPTION OF THE DRAWINGS

Figure 1:
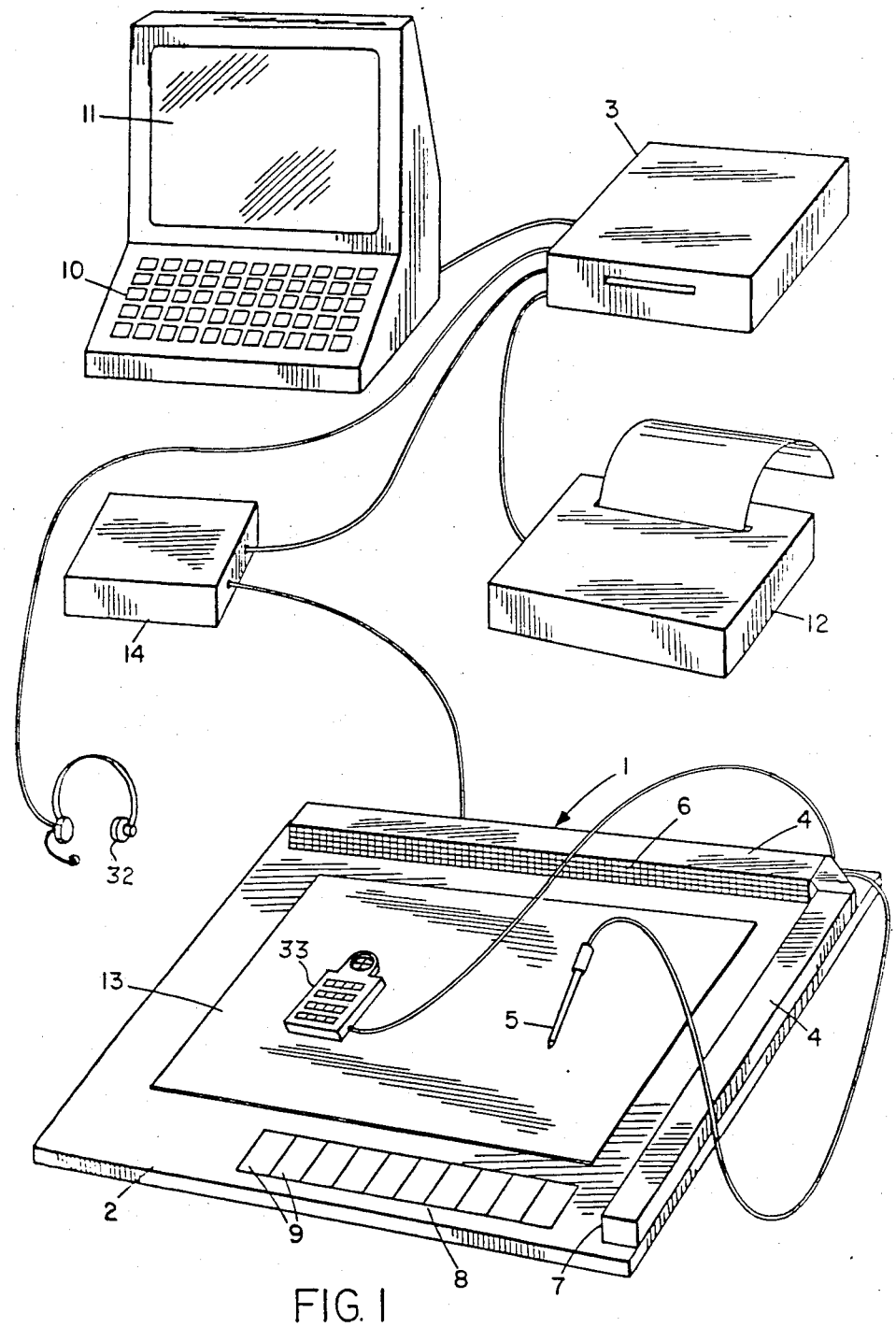
FIG. 1 is a schematic pictorial view of the digitizing system according to a preferred embodiment of the invention.

In my earlier application, Ser. No. 597,132 now U.S. Pat. No. 4,578,768 referred to above, a computer aided coordinate digitizing system is described which basically comprises a digitizing device 1 which has been positioned on a flat surface 2 which may be suitable horizontal or elevated surface such as a table, wall, inclined drawing board, blackboard or the like, and a computer 3 associated with the digitizing device. The digitizing device 1 is adapted to measure X-Y positions on a map, plan or other drawing placed on the flat surface 2, as described in more detail below.

According to one embodiment, the digitizing device 1 comprises a sensor assembly 4 and a pointer device 5 for giving out signals to be detected by the sensor assembly. In the preferred embodiment shown, the sensor assembly 4 comprises a pair of sensitive, linear microphones 6 and 7 arranged in an L-frame shape on the flat surface 2, (left or right angle mounted,) to define X and Y coordinate directions on the surface. The surface 2 may be any suitable flat surface such as a table, drawing board, wall, or the like. The pointer device 5 may comprise a pen-like writing stylus similar to the type described in U.S. Pat. No. 3,626,483, which produces a sound wave generated by a spark when it is touched to a surface. The microphones are preferably linear capacitor electric foil for construction microphones similar to the type described in U.S. Pat. No. 3,821,491.

The digitizing device may alternatively comprise an electromagnetic or electrostatic tablet having a grid of sensors on which the control sheet and a plan, map or other drawing can be placed. Positions on the plan or map are detected when pressure or electrical charge, for examples, is applied to those positions. Another alternative digitizing device comprises an electromechanical articulated arm with a pointer of any type at its free end. arm allows the pointer to be moved in the X-Y and Z directions. The articulated arm includes detectors for detecting such movements, and may be calibrated with any suitable flat surface on which a plan, map or drawing to be measured can be placed.

The stylus 5 may be replaced by a programmable cursor 33 as shown in FIG. 1. The cursor 33 is moved across the surface until the cross hairs are centered on the desired position, and the cursor is then activated to produce a suitable signal for detection by the sensor assembly, which may be microphones as shown in FIG. 1 or an electromagnetic or electrostatic tablet as described above in place of surface 2. In the latter case, the cursor is arranged to fire a spark at the cross hairs.

In application Ser. No. 597,132 a control device is described which comprises a plastic control sheet or menu 8 adapted to be precisely positioned on the flat surface 2 in the field monitored by the microphones 6, as described in more detail below. A series of computer functional control area boxes 9 are located on the control sheet 8.

According to a preferred embodiment of the present invention, this control device is augmented or replaced by a control device for operating the system by voice entry of commands. This device comprises a voice recognition unit or speech input system 30 connected to microphone 32, which may be any suitable microphone such as the headset microphone shown which plugs into the speech recognition unit 30. The voice recognition unit 30 is linked to transmit to the computer 3 control and calculating functions corresponding to vocal commands entered at the microphone.

The computer 3 is associated with a keyboard unit 10, a video display unit 11, and a printer unit 12, as seen in FIGS. 1 and 2. Any suitable computer and peripheral devices may be used. An interface device 14 interfaces the computer 3 to the digitizing device 1.

Suitable computers for use in this system include the KAYPRO II, IV, or X or compatible models, or the IBM PC, PCXT, PC Junior or other compatible models.

Any suitable computer speech input system may be used. In the preferred embodiment of the invention, a Pronounce Speech Input System which is produced by Microphonics is used. This system can be trained according to instructions given in the associated user's manual to recognize new words in order to control a chosen application program. Thus suitable programs can be set up for carrying out construction estimates, as described in my earlier application Ser. No. 597,132, now U.S. Pat. No. 4,578,768 and the Speech Input System can be trained to activate a programmed string of functions in response to entry of a single word or short sentence, culminating in a result being displayed on the screen 11. A series of different programs may be provided for activation by user chosen word commands.

The Pronounce Speech Input System consists of a circuit card or board which can be plugged into any IBM-PC, XT, AT or IBM compatible computer, a microphone which plugs into the circuit card, and a program which operates the system.

To operate the system, the microphones 6 and 7 and control sheet 8 (if used) must first be set up on the suitable flat surface. The computer 3 may be preprogrammed to recognize X-Y coordinate data corresponding to control areas on the control sheet 9 as the appropriate control commands, if a control sheet is used. The program listing for setting up these coordinates on a computer will be discussed below. The control sheet 9 is utilized so that its control areas correspond to the programmed X-Y coordinate positions, and it can be used as a control device for operating the computer by touching the stylus 5 to appropriate control areas on the sheet. Alternatively, the computer and voice recognition unit are preprogrammed to activate the same control commands or any keyboard function in response to entry of one or more vocal commands by a user, as described in more detail below.

Any desired control functions may be entered by suitable vocal commands or provided on the control sheet, or both. The functions are associated with appropriate instructions in the computer's memory. Various different control functions may be provided for different applications of the system. FIG. 3 represents one suitable control sheet or menu on which a series of control areas are provided within boxes 9 printed on the sheet 8. Each box has one or more commands, entry or control functions printed on it, and each of these functions will be associated in the computer with a corresponding X-Y position relative to the microphones 6 and 7.

The menu functions of FIG. 3 or the keyboard 10 may additionally or alternatively be addressed via the Speech Input System, which is preprogrammed to recognize one or more vocal commands and to initiate one or a string of computer functions, called MACROS, in response to chosen vocal commands. The speech input system and program instructions can be arranged so that user input of a one word or short sentence command will initiate a string of sequential functions culminating in the display of a result on the screen, in an equivalent manner to keyboard or control sheet entry of one or more commands to initiate a programmed sequence of events.

When the system has been set up with the control sheet 8 correctly positioned, a plan or other drawing 13 is placed on the surface 2 in the field of the microphones 6 and 7 or on the electromagnetic or electrostatic board. The system is then set up to perform any one of a series of measurements, calculations and other programmed functions at the option of the operator by simply placing the stylus 5 or programmable cursor at appropriate positions on plan 13, and entering appropriate commands via microphone 32 or sheet 8. When the stylus 5 is placed at a point on the sheet 8 or plan 13, it emits a sound which is detected by the microphones to enable them to precisely pinpoint the position touched. A signal representing the X-Y coordinates of that position is them entered in the computer's memory. The computer can be programmed to distinguish plan positions from control sheet positions and to operate accordingly, if a control sheet is used.

The control sheet 8 shown in FIG. 3 is provided with various types of control functions collected together in groups corresponding to programmed computer operations. These control functions can also be addressed via the voice recognition unit 30 so that the unit 30 recognizes one or more corresponding vocal commands entered at the microphone and converts them into appropriate computer control signals initiating the desired operation or sequence of operations. The functions of FIG. 3 are examples of many possible command or control functions which may be provided in the system if desired.

A first group of functions 16 for making conversions from one set of units to another and vice versa may be provided. In the example embodiment illustrated, these conversions may include feet to yards, square feet to square yards, inches to feet, cubic feet to cubic yards, pounds to tons, and/or metric measurements.

The second group 17 may provide a listing of various programs available in the computer for handling data, for example, such as "Weight," which is a program for calculating weight of material. Also included in the preferred embodiment are pitch, area, MBF, topography, angles, volume, units required. Also included are computer control function boxes.

A third group 18 may list various mathematical functions which can be carried out directly by the operator. A fourth group 19 could provide numerical entry boxes and YES/NO responses for entering data not available on the plan, such as numerical scale, depths or thicknesses, weight per unit, and so on. The fifth group 20 may provide function boxes for carrying out direct measurements from a plan, such as length and area. A sixth group 21 may provide operations functions such as CE (Clear), RESTART, and PAGE (to record a plan page number). The operations function COMP. PROG. activates a compensation program, which allows the operator to compensate for stretching or shrinking of paper, or Not to Scale (NTS) drawings. The operator enters the longest vertical and longest horizontal dimensions from the plans. The program will then automatically compensate for any future measurements made until the scale is changed by the operator. The SCALE function is used to enter plan scales, according to a key 22 printed on the control sheet.

Some or all of these functions may be provided by suitable programming of the system, and the system may provide additional or alternative functions if desired, according to the particular application.

The method of making direct measurements using the system with either the voice recognition unit or the control sheet shown in FIG. 3 will now be described. It will be understood that all the commands or functions described may be entered either via the speech input system, by using the control sheet, or via the keyboard, at the option of the operator. Preferably a switch is provided for selecting which control option is to be used, and this may be foot operated so that the operator can switch back and forth at will, or by a simple voice command. Alternatively, the system may be operated by vocal commands alone, with the keyboard, control sheet and control sheet position programming instructions omitted partially or entirely. This provides a simple and easy method of operating the system.

If an operator wishes to find the area of a four cornered design on a plan, for example, the plan scale is first entered by touching the stylus 5 or cursor to the SCALE box and the appropriate numerical boxes, or by appropriate voice commands at microphone 32. The measurement box "POINT AREA" is then touched or the corresponding vocal command given. The stylus or cursor is then touched to each corner of the design. The area enclosed is then computed automatically and the result given on the view display. To calculate the area or perimeter of a curved or other odd-shaped design, the operator gives the command "TRACE AREA" or "CON. LENGTH" (continuous length) via the microphone, keyboard or control sheet, and then traces the outline of the design. The "POINT LENGTH" is used to determine straight lengths or the perimeter length of a straight cornered structure, and "SEG. LENGTH" is used to determine the lengths of a series of segments or lines on a plan, for example lines representing beams, headers, pipes, and so on. The lengths will be listed individually, and a total will be computed. "COUNT UP" and "COUNT DOWN" are used for counting individual items on a plan, such as electrical outlets. The FINISH command is used at the end of any measurement made. SAVE is used to store measurements in the computer's memory.

A series of programs are provided for carrying out sequential computations from measurements taken from a plan or map. These programs can be designed for various applications of the system, such as building, construction, real estate, planning and land use, highway departments, transportation, military and medical applications. The programs provided via commands entered on the menu shown in FIG. 3, the keyboard, or via the voice recognition unit may be designed for building or construction applications, but suitable programs could clearly be provided for the quantity and cost estimates necessary in other fields.

The function of the programs provided in a construction application will now be described briefly. "WEIGHT" is used when a calculation of a total weight of material is desired. An appropriate measurement function, and the weight per unit is either stored in the computer memory or entered using the numbered boxes or the voice recognition unit. A total weight will then be calculated by the computer.

"PITCH" is used to compute roofing areas based on the slope of the roof and the number of squares of roofing required. The total roof area is first calculated using "POINT AREA". The roof pitch is then entered. The numbers of squares of roofing required is then reported.

"AREA" is used when a dimension not on the plan is needed. For example, if the length of all walls has been calculated using "POINT LENGTH", their area can be calculated by using the "AREA" program and entering the height of the walls.

"MBF" is used to convert lengths of lumber to mill board measure, when the lengths have been measured using "SEG. LENGTH", "POINT LENGTH" OR "CON LENGTH."

"TOPO" is used in land engineering to trace topographical areas, and to compute earth movement.

"ANGLE" is used to determine any angle of a triangle, the length of the sides of a triangle, or any area within a triangle.

"VOL" is used to determine a volume after an area has been measured. For example, if the volume of concrete in a slab floor is to be measured, the area is first determined using "POINT AREA." The thickness or depth of the concrete floor is then entered. The resultant answer gives the volume of concrete contained in the floor.

"UNITS REQ'D" determines the total number of individual units required at a programmed spacing, e.g. the number of joists required at a selected spacing for a previously measured length of floor, for example.

Suitable programs are provided to determine construction cost estimates from stored material costs data and parameters calculated from the drawings.

"KEYB'D" allows access to the computer keyboard unit 10 in order to enter written notations or to change descriptions of an item to be listed on a print-out, or to insert program commands in lieu of digitizing or voice activating them.

"PRINT" is the control commanding the printer unit 12 to print out designated information and calculations.

Clearly other programs or alternative programs may be provided for specific purposes.

A listing of the code for the computer program which operates a computer to perform the functions described above is disclosed with application Ser. No. 597,132, and such disclosure is hereby incorporated herein by specific reference. It is entitled Computer Aided Coordinate Digitizing System: DDT VERS 2.2. This program may also be used in the voice activated control system.

The initial set-up of the system using a voice activated unit such as the Pronounce Speech Input System will now be described. The Pronounce System is first trained to understand a chosen vocabulary of single or multiple word commands. Each chosen word command is first spoken into the microphone, and the definition of that command is entered on the keyboard, as described in the Pronounce User's Manual. After a chosen word command is entered, the keystrokes which are to be executed in response to that command are typed in, and the command may be arranged to initiate one or a sequence of computer functions, called MACROS. From that point, user entry of that word command will be equivalent to typing in the selected keystrokes on the keyboard.

Thus the keystroke "definition" or "macro" of a word command which is entered on the keyboard can be designed to perform a specific function or string of functions on subsequent entry of that command vocally in the microphone. In the building estimating system described above, a user can speak a single word or sentence in order to activate a string of programmed computer functions culminating in the end results, for example a total cost or materials estimate, being displayed on the screen. Once the voice activated system is loaded, or "trained," according to the specific application program, the program can be run using voice rather than a keyboard or control sheet. Since a single spoken command can initiate a whole string of functions, the system becomes much faster to operate.

The system can be set up to perform as many multiple functions automatically in response to a single spoken command as desired, by suitable entry of keystroke definitions to correspond to the command. Each time that command is spoken, the keystroke definition will be entered automatically to control the computer to perform selected function or functions.

Thus the user can produce multiple vocabularies, each one referring to a specific application or category of construction such as framing, drywall, concrete work, site work, and so on. Takeoffs and estimates of any chosen type can then be run with the appropriate word command, using the appropriate application program. Various different application programs can be provided on separate discs.

When the user has chosen a command vocabulary, the Pronounce program is loaded into the computer's memory, along with the chosen application program. This system requires the operator only to digitize the quantities from the plan at the appropriate time and to initiate a chosen operation or sequence of operations by a single voice command. This is much simpler than in previous systems where it was necessary for operators to perform each function manually in order to accomplish the desired result.

It is relatively easy and fast to use this system to make construction cost estimates. A series of construction drawings representing a structure to be built are laid on the flat surface, appropriate points are digitized and a sequence of calculations can be made on entry of one or more simple word commands to provide an estimated total cost of materials for the structure.

The digitizing system according to this invention is thus quick, convenient and accurate to use. The provision of a voice operated control device which can be operated by vocal commands of an operator results in easy and convenient operation of the system, since the operator does not have to lay down the stylus repeatedly in order to enter instructions at the computer keyboard. This control device may be used alone to operate the system, but a control sheet may optionally be provided in addition to the voice recognition unit for operation by the digitizing stylus or cursor as described above. Thus the system may provide three different control devices, the digitizer control sheet, the keyboard and the speech input system. All the necessary computer control and operating functions may be provided by both the voice recognition unit and the control sheet, so that the operator can decide which control medium to use, or alternatively certain commands may be provided via the voice recognition unit with others entered via the control sheet, or keyboard, for example.

When the voice recognition or speech input system 30 alone is used, the system may be arranged to activate a string of computer functions automatically on entry of a single command consisting of one or more words, and to display the result automatically. The user can set up the system to perform as many multiple functions as they desire automatically. This is much easier than entering each specific command function manually. The voice commands automatically address the basic menu functions provided above and automatically input the functions to the computer at the appropriate time. All the operator has to do is initiate the operation by the appropriate vocal command and to digitize the appropriate quantities at a suitable time using the stylus or programmable cursor. The cursor may be provided with keys and may be pre-programmed to allow some commands to be entered at the cursor rather than via the control sheet, keyboard or voice input unit.

The digitizing device and control device can be interfaced to most computers using a compatible operating system.

This system is not necessarily designed exclusively for use in construction Takeoffs and estimates as herein described. By modifying the control areas provided within boxes 9 printed on control sheet 8 utilizing programs indigenous to the user's requirements, the system becomes a data input method applicable to Private Aviation, Medical Applications, education, transportation, Marine technology, architecture, engineering, military, and others.

It will be clear that modifications can be made to the disclosed embodiment without departing from the scope of the invention. The invention is therefore not limited to the disclosed embodiment but is defined by the appended claims.

I claim:

1. A computer aided coordinate digitizing system for use in making construction estimates, comprising:

a digitizing device for determining a series of X-Y coordinate positions on a flat surface, comprising pointer means for placing at selected positions on the flat surface and sensor means for detecting the position of said pointer means and generating a series of X-Y coordinate data positions relative to selected positions on construction drawings placed on the flat surface corresponding to positioning of said pointer means at the selected positions;

a computer associated with said digitizing device and linking means for allowing said computer to receive said coordinate signals, said computer having memory means for storing program instructions and said coordinate signals, said program instructions including means for using said X-Y coordinate data positions to calculate a series of desired parameters relative to a structure represented on said construction drawings for generating an estimate of the cost of construction of the structure; and user operated control means for operating said system, comprising voice activated control means for recognizing voice word commands entered by a user and generating one or more computer control signals in response to each voice entered command.

2. The system as claimed in claim 1 wherein said user operated control means further includes a control sheet for placing on said flat surface;

said control sheet having a plurality of control areas each corresponding to a selected computer function, said computer program instructions further including means for associating pre-selected X-Y coordinate signals with selected computer functions, and means for positioning said control sheet such that each of said control areas coincides with a respective one of said pre-selected X-Y coordinate positions.

3. The system as claimed in claim 2, wherein said user operated control means further includes a keyboard associated with said computer and switch means for selectively controlling said computer via said voice recognition means, keyboard or said control sheet.

4. The system as claimed in claim 1, wherein said voice recognition means includes means for recognition of vocal commands corresponding to numerical entry, computer operating functions, and activation of program instructions stored in said computer.

5. The system as claimed in claim 1, wherein said voice recognition means includes means for recognizing a predetermined vocal command corresponding to a preselected sequence of control functions and for converting said vocal command into the corresponding computer control signal for initiating each control function, said computer program instructions including means for performing the preselected sequence of functions in response to the respective control signal.

6. The system as claimed in claim 5, wherein said control functions comprise means for generating an estimate of the total cost of a building represented or a plan.

7. The system as claimed in claim 1, wherein said pointer means comprises a programmable cursor for moving over said surface, said cursor having cross hairs for centering at chosen cursor positions on said surface and means for generating a signal for detection by said sensor means.

8. A method of generating an estimate of the cost of construction of a building represented by a plan comprising a series of construction drawings, comprising the steps of:

placing a series of construction drawings representing a building plan sequentially on a flat surface.

positioning a pointer device at a series of selected positions on each drawing;

monitoring the pointer device with a sensing device linked to a computer;

controlling the sensing device to generate a series of X-Y coordinate signals corresponding to the positioning of the pointer device on the drawing;

providing the generated series of X-Y coordinate signals as data input to the computer; and controlling the computer by means of a voice recognition device to respond to entry of at least one vocal command into the device to utilize the data input from the sensor device and program instructions stored in the memory of the computer to calculate a series of desired parameters and to generate from the calculated parameters an estimate of the cost of construction of a building represented by the construction drawings.

* * * * *